United States Patent
Chen et al.

(10) Patent No.: US 10,997,176 B2
(45) Date of Patent: May 4, 2021

(54) MASSIVE TIME SERIES CORRELATION SIMILARITY COMPUTATION

(71) Applicant: International Business Machines Corporation, Armonk, NY (US)

(72) Inventors: Xiaoyan Chen, Beijing (CN); Yaoliang Chen, Shanghai (CN); Sheng Huang, Shanghai (CN); Lalitha Krishnamoorthy, Beaverton, OR (US); Xiaomin Xu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1025 days.

(21) Appl. No.: 14/749,709

(22) Filed: Jun. 25, 2015

(65) Prior Publication Data

US 2016/0378809 A1 Dec. 29, 2016

(51) Int. Cl.
*G06F 16/2455* (2019.01)
*G06F 17/18* (2006.01)

(52) U.S. Cl.
CPC .......... *G06F 16/2455* (2019.01); *G06F 17/18* (2013.01)

(58) Field of Classification Search
None
See application file for complete search history.

(56) References Cited

U.S. PATENT DOCUMENTS

| | | | |
|---|---|---|---|
| 7,711,734 B2 | 5/2010 | Leonard | |
| 7,770,072 B2 | 8/2010 | Handley et al. | |
| 8,171,033 B2 | 5/2012 | Marvasti | |
| 8,825,571 B1 | 9/2014 | Alfonseca et al. | |
| 9,959,346 B2 * | 5/2018 | Hefeeda | G06F 16/71 |
| 2009/0228474 A1 * | 9/2009 | Chiu | G06F 17/30516 |
| 2012/0109563 A1 | 5/2012 | Haam et al. | |

FOREIGN PATENT DOCUMENTS

CN 103577562 2/2014

OTHER PUBLICATIONS

Lu et al.; "Efficient Processing of k Nearest Neighbor Joins using MapReduce;" Aug. 27-31, 2012, Istanbul, Turkey; Proceedings of the VLDB Endowment, vol. 5, No. 10; Copyright 2012 VLDB Endowment 2150-8097/12/06.*

(Continued)

*Primary Examiner* — Ashish Thomas
*Assistant Examiner* — Mellissa M. Ohba
(74) *Attorney, Agent, or Firm* — Fleit Intellectual Property Law; Jon Gibbons

(57) ABSTRACT

A system, computer program product, and method for computing a correlation matrix with respect to massive of time-series is described where a threshold ε is specified. The correlations greater than ε do not need to be computed. A distance tree is constructed and used. The distance tree organizes the time-series by their correlation estimations. The correlation similarity is computed with MapReduce function by taking advantage of the distance tree. In an efficient MapReduce manner, there is a small I/O waste for overlapped partition. The load is balanced for uneven data distribution and there is early pruning for unnecessary computation. There is no reliance on dimensional reduction and no reliance on coordinates.

12 Claims, 9 Drawing Sheets

(56) References Cited

OTHER PUBLICATIONS

Kim et al.; "Parallel Top-K Similarity Join Algorithms Using MapReduce;" ICDE '12 Proceedings of the 2012 IEEE 28th International Conference on Data Engineering pp. 510-521; Apr. 1-5, 2012.*

Charapko; "Time Series Similarity Search in Distributed Key-Value Data Stores Using R-Trees;" 2015; UNF Theses and Dissertations. 565; http://digitalcommons.unf.edu/etd/565.*

Xia et al.; "GORDER: An Efficient Method for KNN Join Processing;" Proceedings of the 30th VLDB Conference, Toronto, Canada, 2004.*

Sarje et al.; "A MapReduce Style Framework for Trees," 2009; Iowa State University, Ames, IA, USA (Year: 2009).*

Oktay et al.; "Distance Estimation for Very Large Networks using MapReduce and Network Structure Indices," (Year: 2011).*

Cohen et al.; "Dimensionality Reduction for k-Means Clustering and Low Rank Approximation," Portland, Oregon, USA—Jun. 14-17, 2015; ACM New York, NY, USA (Year: 2011).*

Kampf et al.; "Hadoop.TS: Large-Scale Time-Series Processing," International Journal of Computer Applications (0975-8887) vol. 74—No. 17, Jul. 2013 (Year: 2013).*

Shasha, D., "Fast Calculations of Simple Primitives in Time Series," May 20, 2004, pp. 1-83.

Fuad, M, et al., "Speeding-up the Similarity Search in Time Series Databases by Coupling Dimensionality Reduction Techniques with a Fast-and-dirty Filter," IEEE Sixth International Conference on Semantic Computing, Sep. 22-24, 2010, pp. 1-4.

* cited by examiner

MASSIVE TIME SERIES CORRELATION SIMILARITY COMPUTATION

BACKGROUND

The present invention generally relates to computer analytics, and more specifically to computer analytics as applied to time-series similarity computation with large volumes of data.

The increasing instrumentation of physical and computing processes has given us unprecedented capabilities to collect massive volumes of time-series data. Examples of mass volumes of data being collected are data center management, environmental monitoring, financial engineering, scientific experiments, and mobile asset tracking.

Time-series correlation is one of the most important analytics job. For example, application performance management (APM) software monitors a cluster of servers typically computes the correlations of the metrics of computational resources (e.g. processor rate, memory usage) among all the servers.

Techniques used for massively time-series correlation similarity calculations include brute force techniques. This approach does not scale economically. It requires a large amount of computational resources for large datasets. Another technique is Fast Approximate Correlation. However, this technique does not work well in distributing computing environments. Still another technique is parallel top-K similarity join algorithms using MapReduce. However this technique finds only the top-k correlations.

Furthermore, challenges with current solutions for large time-series correlation similarity computation includes I/O (input/out) of a computing node being wasted for MapReduce functions that use overlapping partitions. Other current solutions rely on dimensional reduction. Many times the time-series dataset is not suitable for the dimensional reduction. Further, these depend on the Euclidean distance. This is a problem when the correlation metric only fulfills triangle inequality but is not based on the coordinates.

SUMMARY

Disclosed is a novel system, computer program product, and method to compute correlation matrix with respect to massive of time-series where a threshold $\varepsilon$ is specified such that the correlations greater than $\varepsilon$ do not need to be computed. Correlations $>=\varepsilon$ do not need to be computed. A distance tree is constructed and used. The distance tree organizes the time-series by their correlation estimations. The correlation similarity is computed with Map Reduce function by taking advantage of the distance tree. In an efficient MapReduce function there is a little wasted I/O for overlapped partitions. The load is balanced for uneven data distribution and there is early pruning for unnecessary computation. There is no reliance on dimensional reduction and no reliance on coordinates.

More specifically, disclosed is a system, computer program product, and method for producing a time-series correlation on large volumes of data. The method begins with constructing an ordered center point list (C). The elements in center point list (C) are a time-series dataset (T). Next, the time-series dataset (T) are parsed into sub-sets (M) based on a partition number (pnum). The sub-sets (M) of the time-series dataset (T) are assigned to a plurality of computing nodes for distributed processing using a MapReduce function. A distance tree for each sub-set (M) in a set of sub-sets (M) is constructed by selecting an initial center point C as C[0] for a given level 1 of a node in a tree graph. A root node is constructed. The sub-set (M) of the time-series dataset (T) are assigned one-by-one into vertices of the tree graph connected with the root node. A node of a distance tree with the center point C[0] is selected, where a correlation to the center point of a parent node to any non-root node satisfies $pnum*\varepsilon \leq C < (pnum+1)*\varepsilon$, wherein $\varepsilon$ is a settable threshold. A loop of three steps (a, b, c) is entered. In step (a) a distance is computed between the sub-set (M) to the initial center point (C[0]) for each node that is not a leaf node. The process continues to a child node of the initial center point (C[0]). In step (b) if the child node does not exist, a leaf node with C=C[1], pnum=D, arr={T} is created. This process repeats back to step (a) for a next node. In step (c) if the child node exists, the process repeats step (a) for a next node. The distance tree that has been constructed is applied to each sub-set (M) to at least one of one of the computing nodes to compute a correlation on the sub-set (M) at the computing node.

In another example, the loop includes another step (d). In step (d) for each node that is a leaf node, inserting the sub-set (M) of the time-series dataset (T) into an array (arr).

In still another example, the loop includes three additional steps (e, f, g). In response to a size of the array (arr) being below a settable threshold (N), step (e) is getting a level (l) of a current leaf node. In step (f), the current leaf node is replaced as a non-leaf node in the sub-set (M) of the time-series dataset (T). In step (g) the array (arr) is split into a number of arrays according to partition number (pnum) computed on a current level center point (C(l)).

In yet still another example, for a node ($N_L$) at level (l) of the node in the tree graph, adding an array (arr) of the node at a level ($N_L$) to a result set (t). A level (l) and partition number (pnum) of ancestor nodes (i) is determined. For each ancestor node of the node ($N_L$), which is not a root node, any adjacent partition number siblings ($N_A$) with partition number pnum[i] or pnum[i]+1 for a corresponding node level (i) are determined. Each child node at level (i) until leaf node or level=1 is identified. For each child node that has been identified that is either a leaf node or at level (i) then add the array (arr) of the node or its descendent leaf to the result set (t). All pair correlation of each time-series in the result set (t) are computed. All the correlations which are greater than $\varepsilon$ are outputted.

In still yet another embodiment, the distance tree is traversed. The distance tree is split at every L/R leaf that is visited where R is the number computing nodes assigned by the MapReduce function. For each subtree, a left-most leaf node $N_L$ is found. The level (l) of the left-most leaf node $N_L$ is determined along with the pnum[i] of its ancestors at level i in the tree graph. For each ancestor of $N_L$ that is not a root node, its children are found with partition number pnum=pnum[i] or pnum[i]+1 for corresponding level i. Each child node at level (i) is identified until leaf node or level=1 and for each child node that has been identified that is either a leaf node or at level (i) then add the node if it is not a leaf node or add the node and its ancestor to the subtree.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
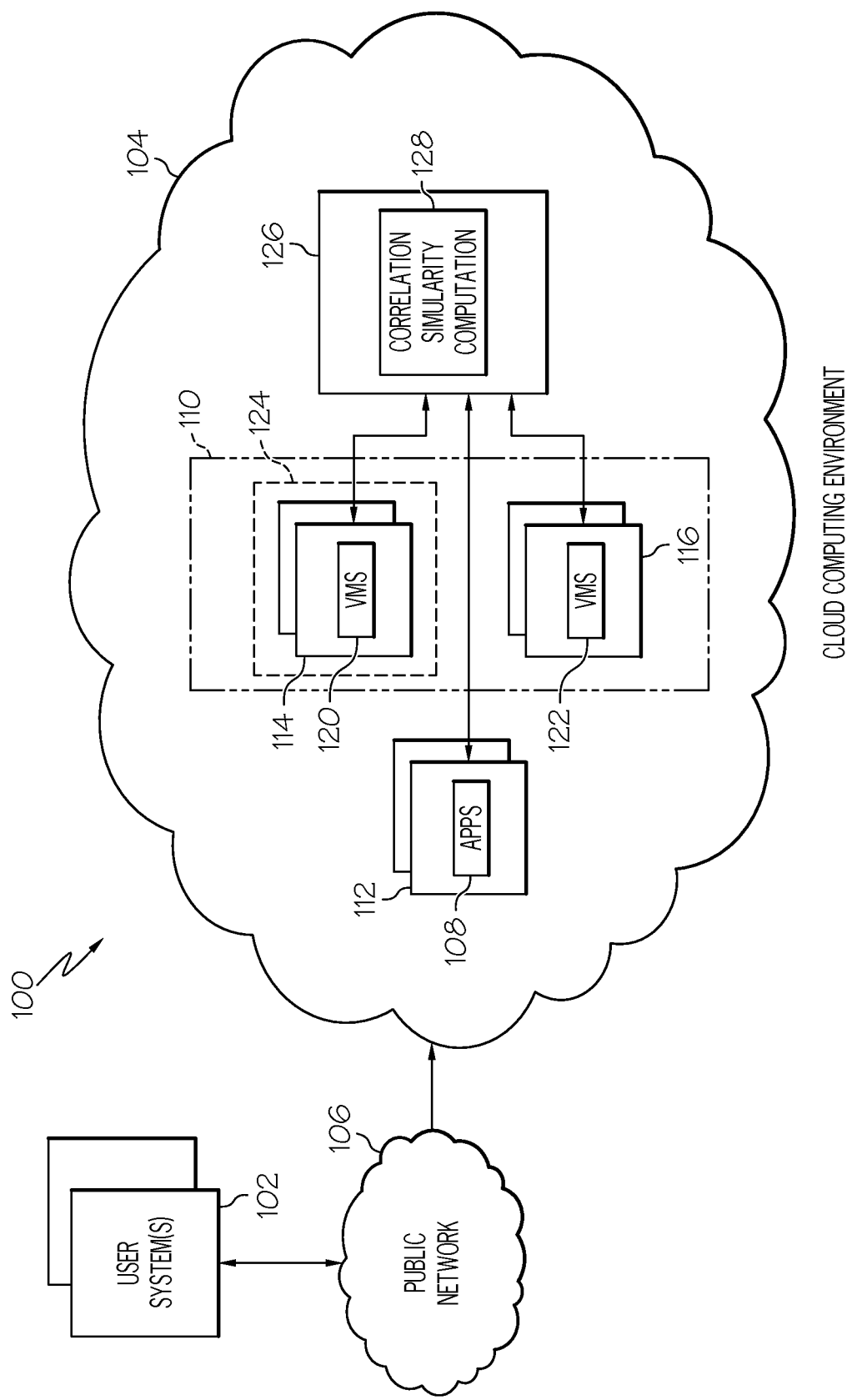
FIG. 1 is a block diagram illustrating one example of an operating environment.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

The present invention extends time-series based analytics technology by supporting correlation similarity computation over massive time-series data. The data structure of distance tree which partitions the time-series by their correlation estimations.

Online and historical management and deep analysis products like Streams or Informix are enhanced by providing the ability of correlation similarity computation over massive time-series.

Non-Limiting Definitions

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "computational resources" is used to mean resources of a computing environment including number of processors, amount of memory, amount of disk space, which typically dictates that amount of computational time required to provision service requests.

The term "computing environment" is used to mean a computing environment where applications, platforms, and infrastructure can be shared across many different users. One example of a computing environment is a cloud computing environment including private, public, and hybrid clouds. Service models for the computing environment include Infrastructure as a Service (IaaS), Platform as a Service (PaaS), and Software as a Service (SaaS).

The term "correlation matrix" is used to mean The correlation matrix of n random variables $X_1, \ldots, X_n$ is the n×n matrix whose i,j entry is $\text{corr}(X_i, X_j)$. If the measures of correlation used are product-moment coefficients, the correlation matrix is the same as the covariance matrix of standardized random variables $X_i/\sigma(X_i)$ for $i=1, \ldots, n$.

The term "MapReduce" is a programming model and an associated implementation for processing and generating large data sets with a parallel, distributed algorithm in a computing environment.

Operating Environment

FIG. 1 shows one example of an operating environment 100 for provisioning resources in a cloud computing environment for multi-tier cloud applications. It should be noted that although the following discussion is directed to a cloud computing environment various embodiment are not limited to such environment and are application to non-cloud computing environments as well. In particular, FIG. 1 shows one or more client/user systems 102 communicatively coupled to one or more cloud computing environments 104 via a public network 106 such as the Internet. The user systems 102 can include, for example, information processing systems such as desktop computers, laptop computers, servers, wireless devices (e.g., mobile phones, tablets, personal digital assistants, etc.), and the like.

The user systems 102 access the cloud computing environment 106 via one or more interfaces (not shown) such as a web browser, application, etc. to utilize resources provided by the environment 104. For example, FIG. 1 shows a plurality of resources such as applications 108 and computing resources 110 available within the cloud computing environment 104. Computing resources 110 include but are not limited to, processing, storage, networking, and other fundamental computing resources. Resources 108, 110 are provided by and/or are hosted on a plurality of physical information processing systems 112, 114, 116 and/or a plurality of virtual machines 118, 120 being executed by physical systems 114, 116. A plurality of physical systems 112, 114, 116, virtual machines 120, 122, or a combination thereof grouped together for providing a resource(s) is referred to as a "cluster" 124.

In one example, a cloud user (via a user system 102) utilizes the cloud environment 104 to deploy a multi-tier web application. In this example, a multi-tier web application is an application (software designed to enable a user to perform a given task) accessible over a network whose presentation, logic (application processing), and data storage processes are performed at physically separate tiers. For example, the presentation processes can be performed on a web server tier; the application processing can be performed on an application server tier; and the data storage processes can be performed on a database server tier. Each of the web server, application server, and database server tiers can be comprised of one or more of the information processing systems 114, 116 and/or VMs 120, 122 in the cloud environment 104.

The cloud computing environment 104 further comprises one or more information processing systems 126 that comprise a correlation similarity computation system 128. It should be noted that the information processing system 126 is not required to reside within the cloud environment 106. The correlation similarity computation system 128 provisions resources in the cloud environment 106 to cloud users. In one embodiment, the correlation similarity computation system 128 performs a correlation similarity computation across multiple server tiers in the plurality of sever tiers for a set of workloads.

Correlation Similarity Computation System Architecture

Figure 2:
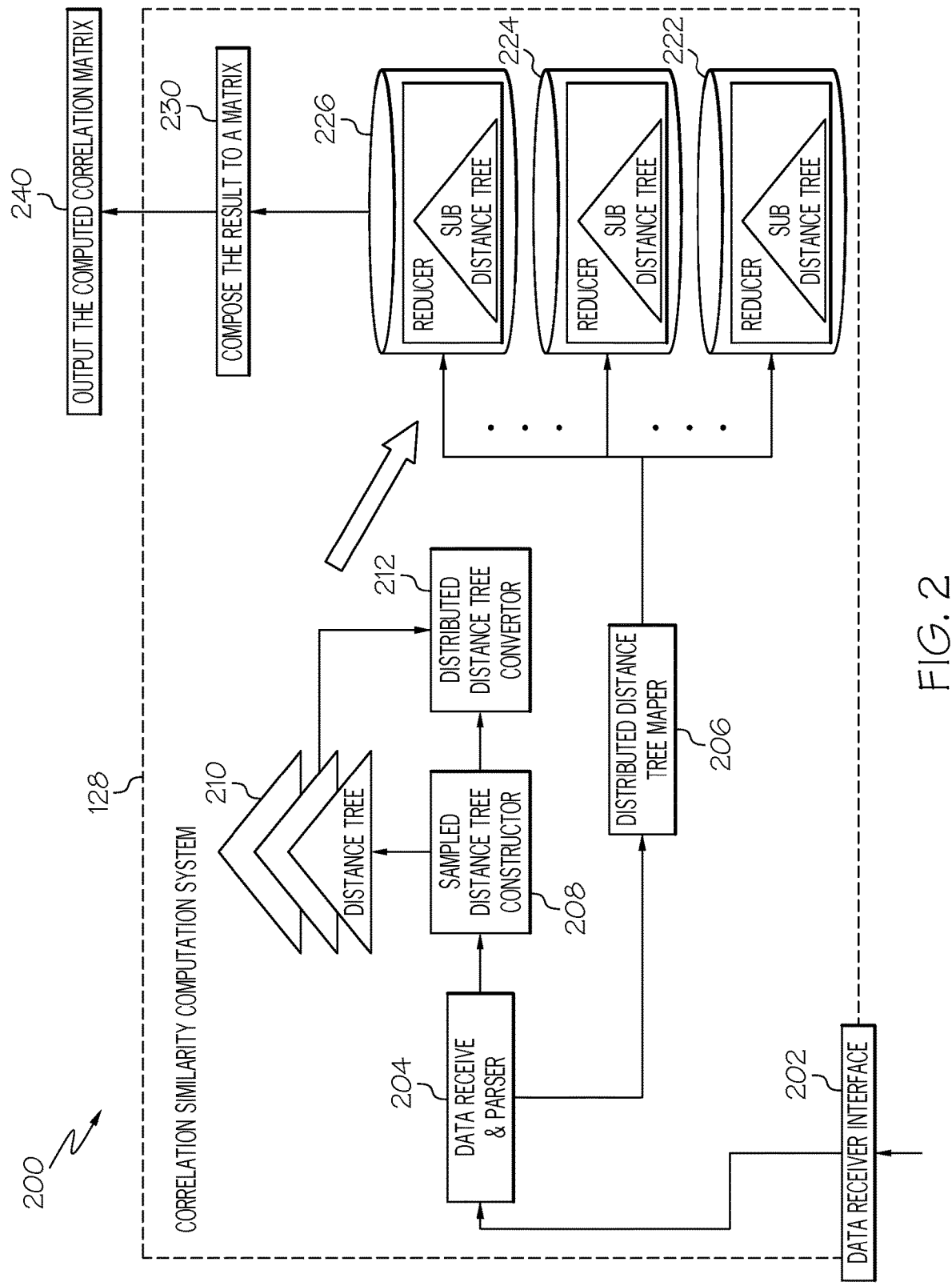
FIG. 2 is a functional block diagram the correlation similarity computation system of FIG. 1.

The correlation similarity computation system 128, in one embodiment as shown in 200 of FIG. 2 comprises a data receiver interface 202 that accesses time-series data set (T) for the correlation similarity computation. A data parser 204 parses the times-series data (T) into sub-sets (M) based on a partition number (pnum). The sub-sets (M) of the time-series dataset (T) are assigned to a plurality of computing nodes 222, 224, 226 for distributed processing using a MapReduce function.

Figure 3:
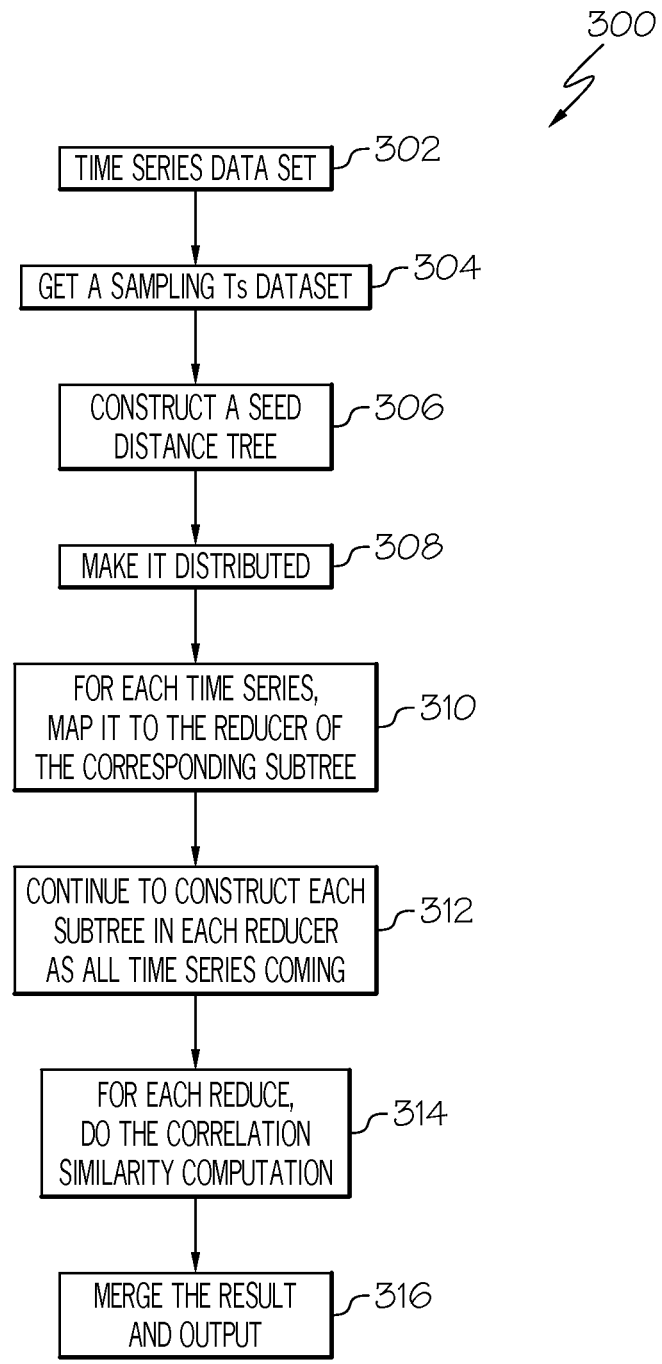
FIG. 3 is a workflow diagram illustrating correlation similarity computation on a distributed distance tree of FIG. 2.

FIG. 2 with reference to a workflow diagram 300 of FIG. 3 illustrating correlation similarity computation on a distributed distance tree of FIG. 2. In parallel to assigning the sub-sets (M), the data parser 204 takes the time-series dataset (T) 302 and parses into sample sub-sets (M) in step 304. The seed distance tree is constructed 306 by a sample tree constructor 208. The distance trees 210 and distributed distance tree convertor 212 work cooperatively to apply the distance tree that has been constructed for each sub-set (M) of the time-series data (T) to a computing node 222, 224, 226 running a MapReduce function, steps 308, 310, 312, and 314.

In one example a density-based method is used to manage the time-series data (T) by their correlation. Using Nature for the MapReduce function, distribute the time-series evenly to the reducers while data redundancy is minimized. Within each reducer, further pruning can be conducted efficiently according to the sub-tree.

A Node of a Distance Tree with Center Point (idx): A reference time-series for the children node partitioning for non-leaf nodes only. Partition Number (pnum) is for any time-series in the node, the correlation to the center point C of the parent node meets $pnum*\varepsilon \leq C < (pnum+1)*\varepsilon$ (not for root node). Buffer Array (arr): (leaf node only). Splitting Threshold (N): The size of arr greater than N will cause a Node splitting. Given a time-series t in a node M, all the time-series whose the correlation to $t \leq \varepsilon$ are in the two adjacent nodes or sub-trees.

The output of the computing nodes 222, 224, 226 are then composed to a matrix 230 and this is the computed correlation matrix which is outputted 240, steps 314, and 316.

Initial Construction of Distance Tree

Figure 4:
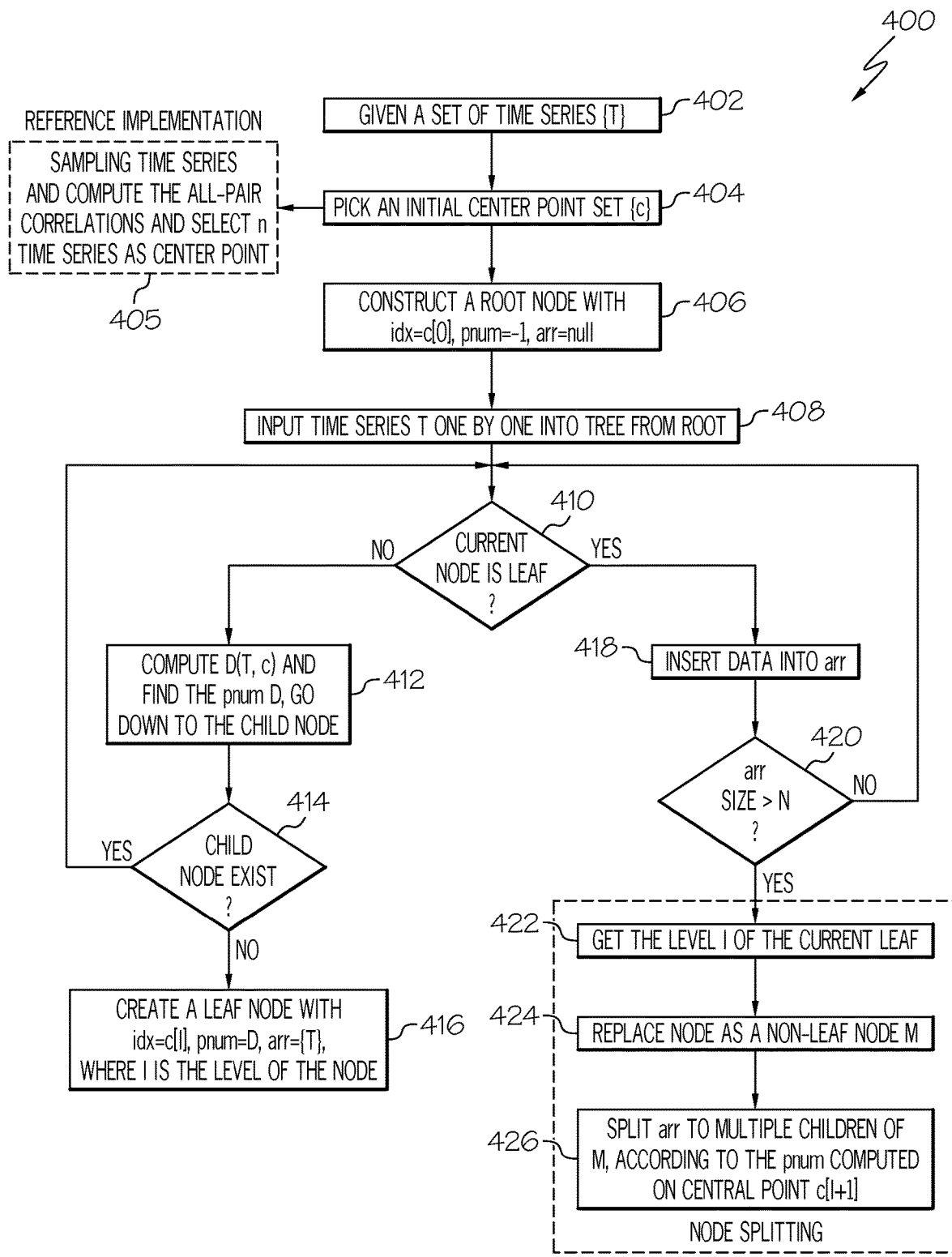
FIG. 4 is a workflow diagram illustrating initial construction of the distance tree of FIG. 3.

FIG. 4 is a workflow diagram 400 illustrating initial construction of the distance tree in step 306 of FIG. 3 and sample distance tree constructor 208 of FIG. 2. The process to construct the distance tree begins at step 402 with for each sub-set (M) in a set of sub-sets (M) of times series data (T). In step 404, an initial center point C as C[0] is selected for a given level 1 of a node in a tree graph. In one example the sampling time series and all-pair correlations for n time series as a center point is saved as a reference implementation in step 405.

A root node is constructed in step 406. The sub-set (M) of the time-series dataset (T) are assigned one-by-one into vertices of the tree graph connected with the root node in step 408. For none leaf nodes in step 410, the process continues to step 412 in which a node of a distance tree with the center point C[0] is selected where a correlation to the center point of a parent node to any non-root node satisfies $pnum*\varepsilon \leq C < (pnum+1)*\varepsilon$, wherein $\varepsilon$ is a settable threshold. A loop is entered where (a) for each node that is not a leaf node, computing distance between the sub-set (M) to the initial center point (C[0]), and go to a child node of the initial center point (C[0]), (b) if the child node does not exist, create a leaf node with C=C[1], pnum=D, arr={T} and repeating step a for a next node, and (c) if the child node exists and repeating step (a) for a next node. This distance tree that has been constructed is then applied as shown in 212, 310 for each sub-set (M) to at least one of one of the computing nodes to compute a correlation on the sub-set (M) at the computing node.

In one example, in step 410 if the current node is not a leaf, the process continues to step 418 in which, for each node that is a leaf node, inserting the sub-set (M) of the time-series dataset (T) into an array (arr). N is a settable threshold by the user. If the size of the array is great less than or equal to N the process returns to step 410. Otherwise, in the case in which the array (arr) size is greater than N, then in steps 422, 424, 426 the process continues by getting a level (l) of a current leaf node and replacing the current leaf node as a non-leaf node in the sub-set (M) of the time-series dataset (T). The array (arr) is split into a number of arrays according to partition number (pnum) computed on a current level center point (C(l)).

Figure 5:
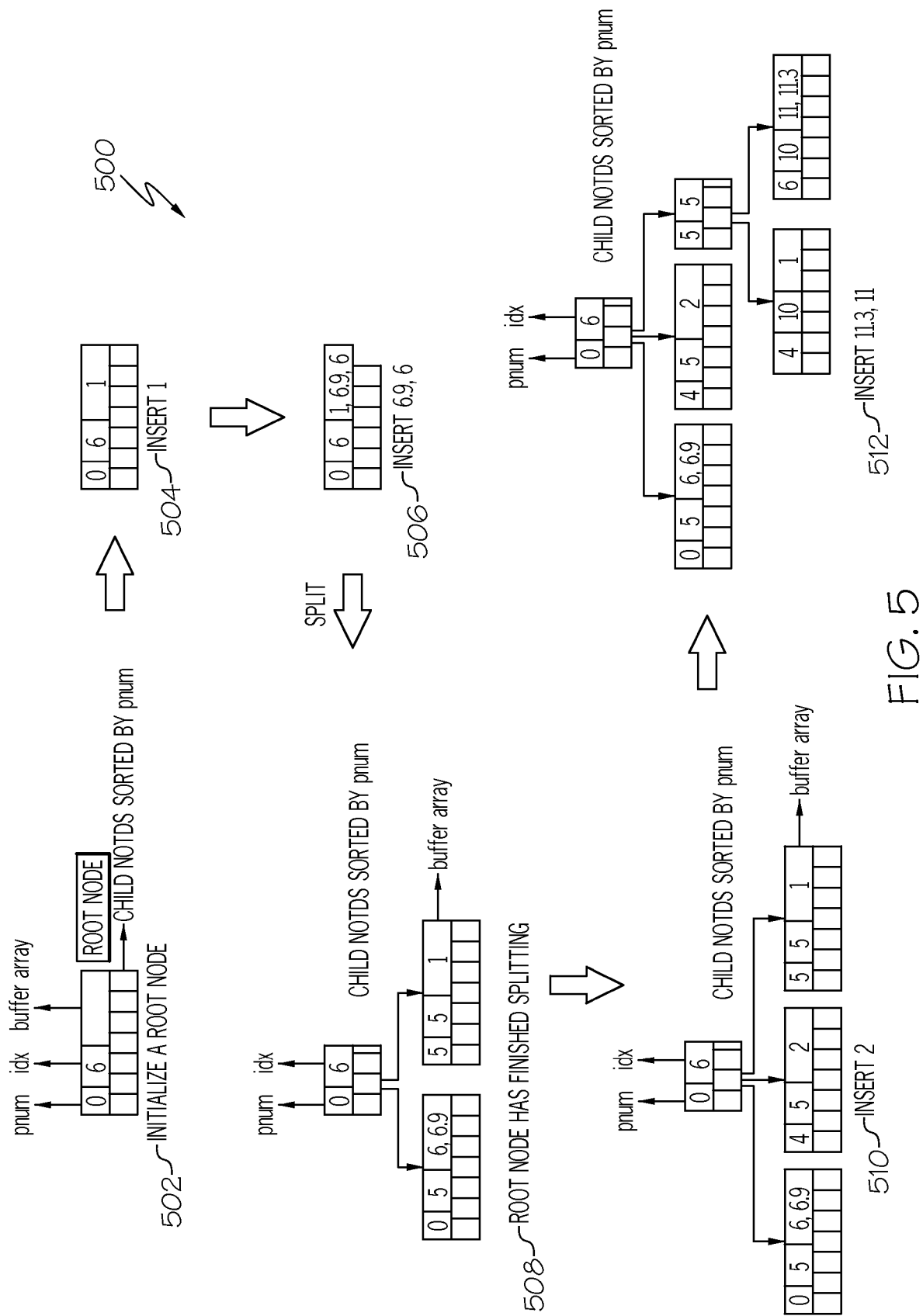
FIG. 5 is a diagram illustrating an example distance tree being constructed in accordance with FIGS. 2-4.

Turning now to FIG. 5 is a diagram 500 illustrating an example distance tree being constructed in accordance with FIGS. 2-4. In this diagram an example time-series dataset S={1, 6.9, 6, 2, 0.2, 11.3, 10}, C={6,5,10}, the length of all the time-series is 1. Insert all the time-series one by one into Distance Tree. $\varepsilon=1$, N=2. $\varepsilon$ is a settable threshold. Step 502 shows a distance tree with pnum, idx, and buffer array (arr) for a root node. Shown are six child nodes for this root node. The child nodes are sorted by pnum. The pnum is shown as zero. Next in step 504 the value 1 from the time-series set S={1, 6.9, 6, 2, 0.2, 11.3, 10} is inserted into the buffer array (arr) of the root node as shown. In step, 506 the values 6.9, 6 from the time-series set S={1, 6.9, 6, 2, 0.2, 11.3, 10} are inserted into the buffer array (arr) as shown. However since N=2, the node root node must be split according to the partition number (pnum), as shown in step 508. The ε is set to 1. Note the pnum for the left-hand child node, the root node has a center point of 6 from C={6,5,10}. The times-series S={1, 6.9, 6, 2, 0.2, 11.3, 10}. So the pnum from the time-series S={1, 6.9, 6, 2, 0.2, 11.3, 10} for the right-hand child node is 6−1=5. Whereas the pnum for the first child row is given by the distance i.e. 6.9−6=0 and 6−6=0. The child nodes are sorted by pnum and root node is finished splitting. In step 510 more of the time series S={1, 6.9, 6, 2, 0.2, 11.3, 10} into the tree with center point 5, i.e. the second element of C={6,5,10} for the first level child node. The pnum for the second child row is 6−2=4. In step 512 the center point is 10 from C={6,5,10}. Data points 11.3 and 10 from the times-series S={1, 6.9, 6, 2, 0.2, 11.3, 10} are added. 11.3−6=5 and 10−6=4, they fall to node with pnum 5. This then splits.

Correlation Computation on a Distributed Distance Tree

Figure 6:
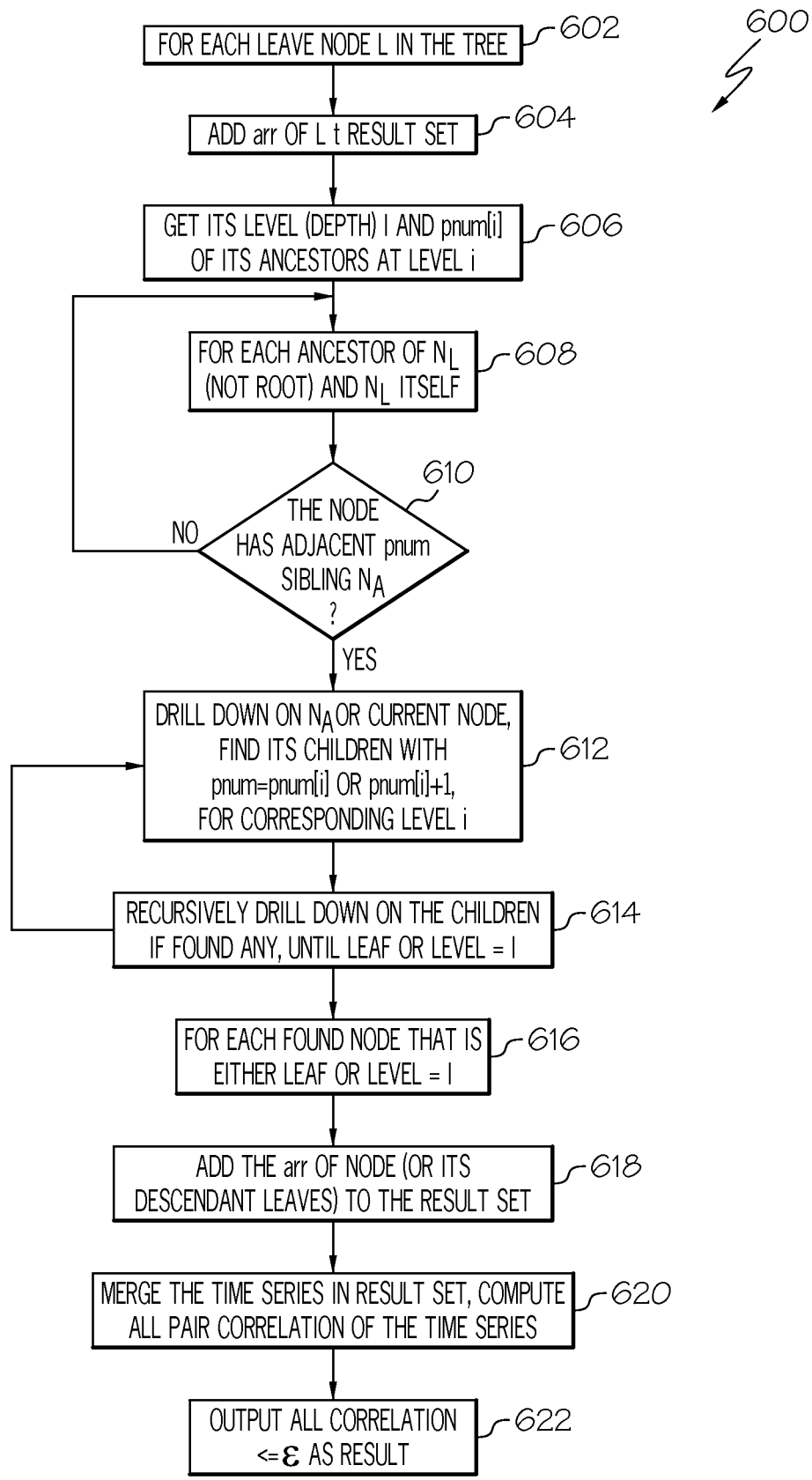
FIG. 6 is a workflow diagram of correlation computation on a distributed distance tree in accordance with FIG. 2.

FIG. 6 is a workflow diagram 600 of correlation computation on a distributed distance tree in accordance with FIG. 4 for 402. The process begins in step 602 with a loop the recursively performs for each leaf node ($N_L$) at level (l) of the node in the tree graph. Next in step 604 an array (arr) of the node at a level ($N_L$) is added to a result set (t). In step 606 a level (l) and partition number (pnum) of ancestor nodes (i) is determined. Recursively in steps 608, 610 determining any adjacent partition number siblings ($N_A$) with partition number pnum[i] or pnum[i]+1 for a corresponding node level (i), for each ancestor node of the node ($N_L$) which is not a root node. Recursively in steps 610, 612, 614, 616, 618 each child node at level (i) is identified until leaf node or level=1 and for each child node that has been identified that is either a leaf node or at level (i) then add the array (arr) of the node or its descendent leaf to the result set (t). In the case the node does not have adjacent pnum siblings ($N_A$), the process return to step 608.

In step 620, the time series in result set (t) are merged and all pair correlation of each time-series in the result set (t) are computed. In step 622, all the correlations are outputted, typically in a correlation matrix, which are greater than ε.

Figure 7:
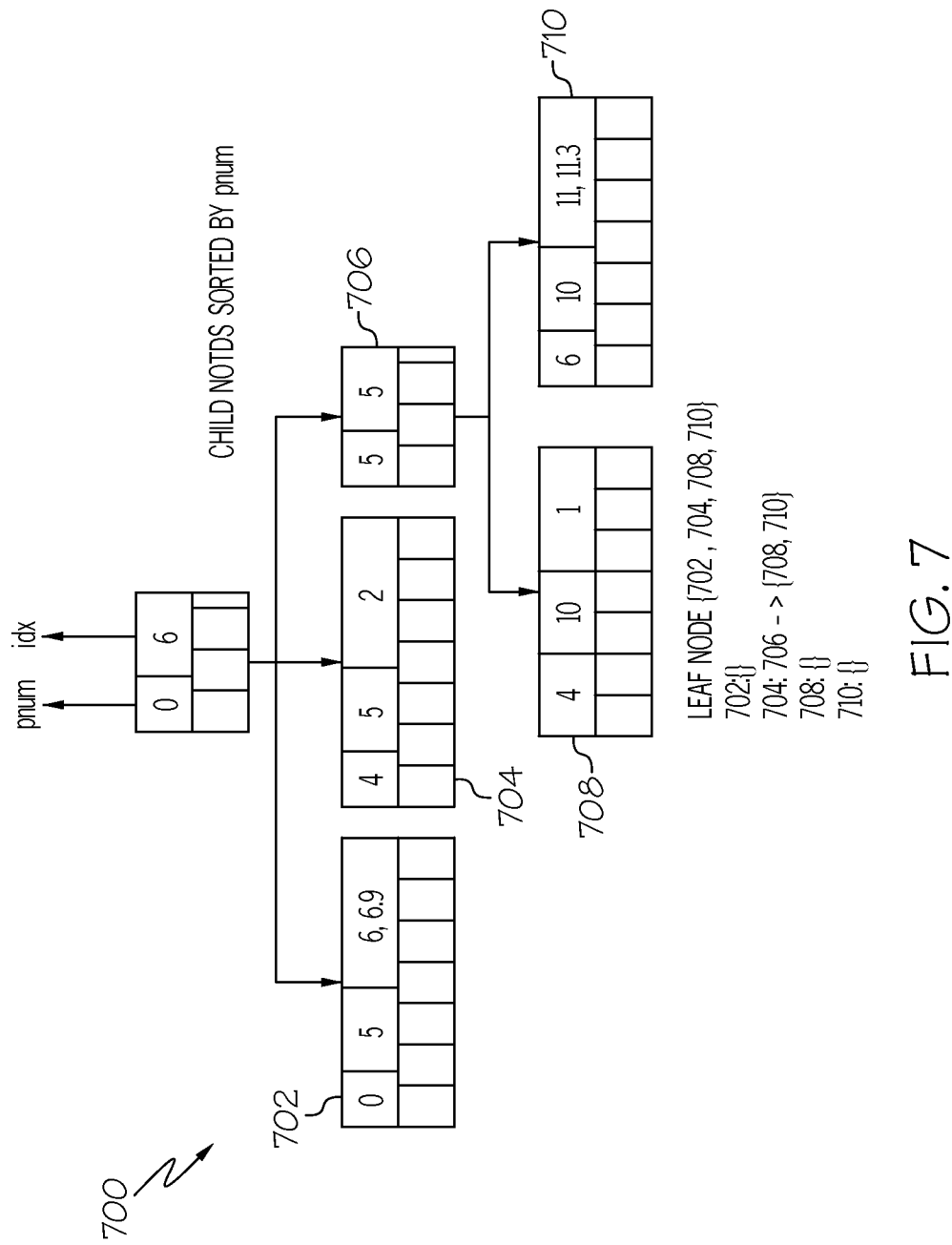
FIG. 7 is a diagram illustrating picking a node for distributing and computing in accordance with FIG. 6.

FIG. 7 is a diagram 700 illustrating picking a node for distributing and computing in accordance with FIG. 6. In this example, the goal is to calculate all pairs of time series correlations that are greater than epsilon=1 (i.e. ε=1). All time series in this example are 1-dimension and thus are represented by a number. They are already indexed in leaf node of the distance tree. They are node 702 (6, 6.9); node 704 (2); node 708 (1); node 710 (11, 11.3). First, the correlation within the nodes (6, 6.9) and (11, 11.3) is computed.

Second, the correlation across any two node with which the difference of pnum is 1 is computed. In this example, node 704 and node 706 has pnum are 4 and 5, respectively. Because node 706 is not a leaf node, all its descendent leaf nodes that are 708 and 710 must be found.

Distributed Distance Tree on a MapReduce Function

Figure 8:
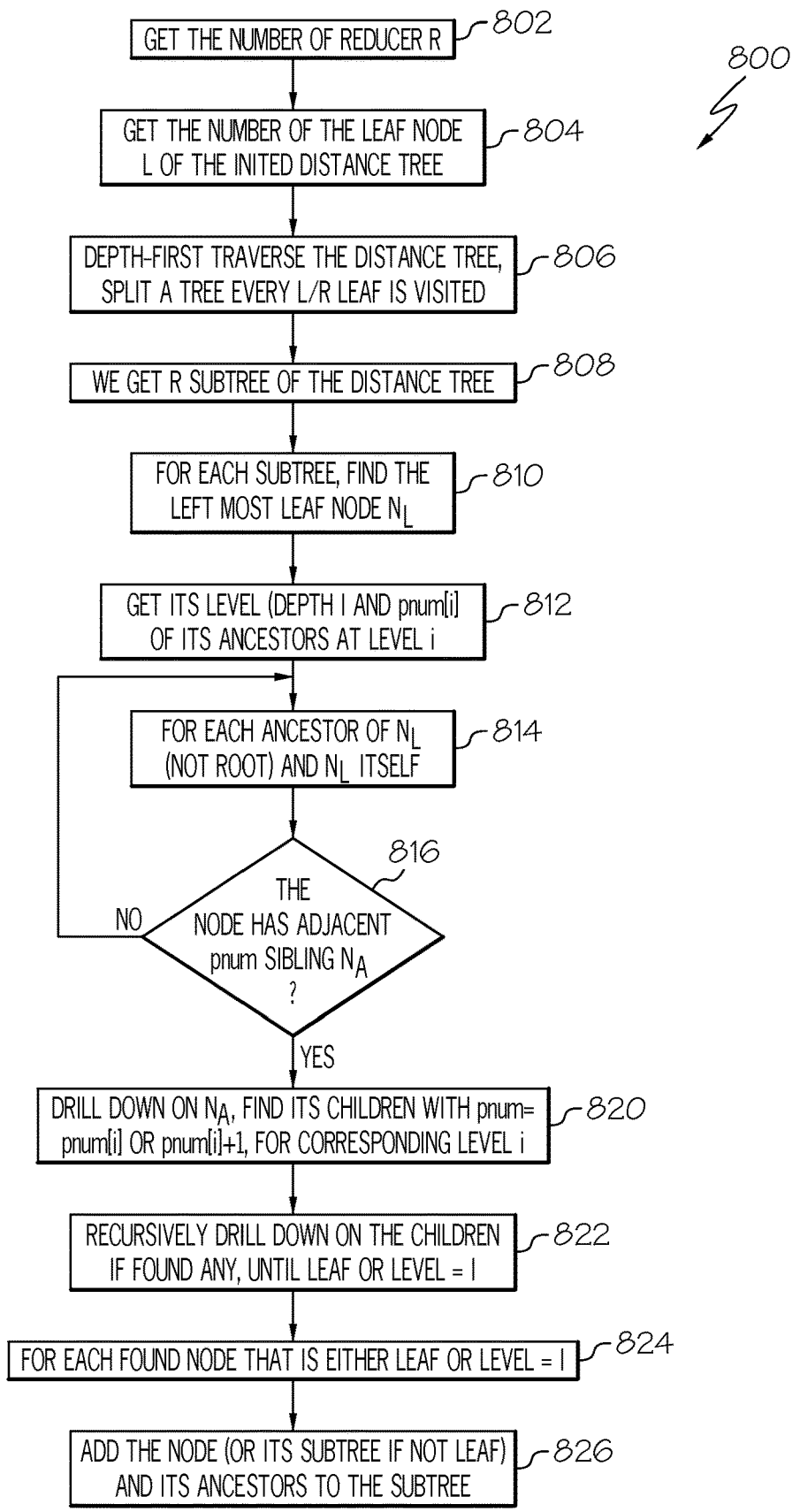
FIG. 8 is a workflow diagram illustrating distributed distance tree on MapReduce construction in accordance with FIG. 3.

FIG. 8 is a workflow diagram 800 illustrating distributed distance tree on MapReduce construction in accordance with FIG. 3. The process begins at step 802 in which the number of available reduce computing nodes 222, 224, 226 is obtained from the system 128. At step 804 the number of leaf nodes L of the initial distance tree is obtained. Step 808, the R substree of the distance is determined. Next a loop is entered in step 810, the distance tree is traversed. The distance tree at every L/R leaf that is visited is split where R is the number computing nodes assigned by the MapReduce function. In step 812, another loop or sub-loop is entered where for each subtree, find a left-most leaf node $N_L$ and get it level (l) and pnum[i] of its ancestors at level i in the tree graph. And another loop or sub-loop in steps 814, 816, 820 for each ancestor of $N_L$ that is not a root node, it children are found with partition number pnum=pnum[i] or pnum[i]+1 for corresponding level i. In the case that the node does not have any adjacent pnum sibling, the process returns to step 814.

In steps 822, 824, 826, recursively drill down identifying each child node at level (i) until leaf node or level=1, and for each child node that has been identified as either a leaf node or at level (i) then add the node if it is not a leaf node or add the node and its ancestor to the subtree.

Generalized Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure comprising a network of interconnected nodes.

Figure 9:
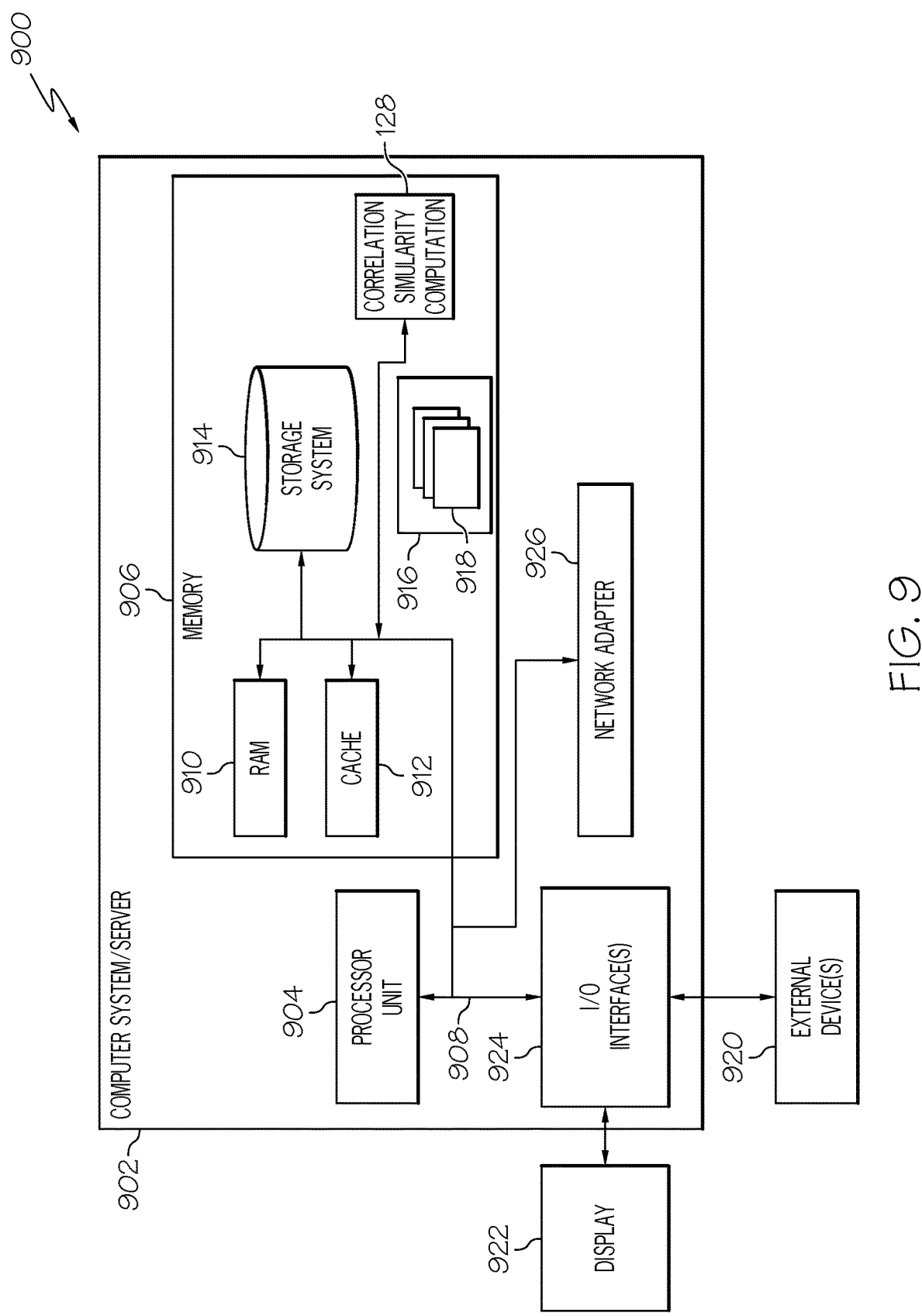
FIG. 9 illustrates one example of a cloud computing node according to one embodiment of the present invention.

Referring now to FIG. 9, a schematic of an example of a cloud computing node is shown. Cloud computing node 900 is only one example of a suitable cloud computing node and is not intended to suggest any limitation as to the scope of use or functionality of embodiments of the invention described herein. Regardless, cloud computing node 900 is capable of being implemented and/or performing any of the functionality set forth hereinabove.

In cloud computing node 900 there is a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 916, 918, a system memory 906, and a bus 908 that couples various system components including system memory 906 to processor 904.

Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 918, having a set (at least one) of program modules, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of embodiments of the invention as described herein. Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 22. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Non-Limiting Examples

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-based method for producing a time-series correlation on large volumes of data, the method comprising:

constructing an ordered center point list (C), wherein elements in the center point list (C) are a time-series dataset (T);

parsing the time-series dataset (T) into sub-sets (M) based on a partition number (pnum);

assigning the sub-sets (M) of the time-series dataset to a plurality of computing nodes for distributed processing using a MapReduce function;

constructing a distance tree for each sub-set (M) in a set of sub-sets (M), which is independent of coordinates of data in the time-series dataset (T) and independent of dimensional reduction, by selecting an initial center point C as C[0] for a given level (l) of a node in a tree graph;

constructing a root node;

assigning the sub-set (M) of the time-series dataset (T) one-by-one into vertices of the tree graph connected with the root node;

selecting a node of a distance tree with the center point C[0], where a correlation to the center point of a parent node to any non-root node satisfies $pnum*\varepsilon \le C < (pnum+1)*\varepsilon$, wherein c is a settable threshold, a) for each node N that is not a leaf node, computing distance between the sub-set (M) to the initial center point (C[0]), and go to a child node of the node N, b) creating a leaf node of node N with C=C[I], pnum=D, arr={T} based on an additional child node of the child node of node N being nonexistent, wherein D is a distance between a centerpoint C=C[I] and data in arr=arr={T}, and c) repeating step a for a next node;

applying the distance tree that has been constructed for each sub-set (M) to at least one of one of the plurality of computing nodes to compute a correlation on the sub-set (M) at the computing node;

for a leaf node (NL) at level (l) of the node in the tree graph:

adding an array (arr) of the node at a level (NL) to a result set (t);

determining a level (l) and partition number (pnum) of ancestor nodes (i);

determining any adjacent partition number siblings (NA) with partition number pnum[i] or pnum[i]+1 for a corresponding node level (i), for each ancestor node of the node (NL) which is not a root node;

identifying each child node at level (i) until leaf node or level=1 and for each child node that has been identified that is either a leaf node or at level (i) then add the array (arr) of the node or its descendent leaf to the result set (t);

computing all pair correlation of each time-series in the result set(t); and outputting all the correlations which are greater than ε.

2. The computer-based method of claim 1, further comprising:

d) for each node that is a leaf node, inserting the sub-set (M) of the time-series dataset (T) into an array (arr).

3. The computer-based method of claim 2, wherein in response to a size of the array (arr) being below a settable threshold (N), further comprising:

e) getting a level (l) of a current leaf node;

f) replacing the current leaf node as a non-leaf node in the sub-set (M) of the time-series dataset (T); and g) splitting the array (arr) into a number of arrays according to partition number (pnum) computed on a current level center point (C(l)).

4. The computer-based method of claim 1, further comprising:
traversing the distance tree and splitting the distance tree at every L/R leaf that is visited where R is the number computing nodes assigned by the MapReduce function;
for each subtree, find a left-most leaf node NL and get it level (l) and pnum[i] of its ancestors at level i in the tree graph;
for each ancestor of NL that is not a root node and find its children with partition number pnum=pnum[i] or pnum [i]+1 for corresponding level i; and
identifying each child node at level (i) until leaf node or level=1 and for each child node that has been identified that is either a leaf node or at level (i) then add the node if it is not a leaf node or add the node and its ancestor to the subtree.

5. A system for producing a time-series correlation on large volumes of data, the system comprising:
a memory;
a processor communicatively coupled to the memory, where the processor is configured to perform
constructing an ordered center point list, wherein elements in the center point list are a time-series dataset;
parsing the time-series dataset into sub-sets based on a partition number;
assigning the sub-sets of the time-series dataset to a plurality of computing nodes for distributed processing using a MapReduce function;
constructing a distance tree for each sub-set (M) in a set of sub-sets (M), which is independent of coordinates of data in the time-series dataset (T) and independent of dimensional reduction, by
selecting an initial center point C[0] for a given level (l) of a node in a tree graph;
constructing a root node;
assigning the sub-set of the time-series dataset one-by-one into vertices of the tree graph connected with the root node;
selecting a node of a distance tree with the center point C[0], where a correlation to the center point of a parent node to any non-root node satisfies $pnum*\varepsilon \leq C < (pnum+1)*\varepsilon$, wherein c is a settable threshold,
   a) for each node N that is not a leaf node, computing distance between the sub-set (M) to the initial center point (C[0]), and go to a child node of the node N,
   b) creating a leaf node of node N with C=C[I], pnum=D, arr={T} based on an additional child node of the child node of node N being nonexistent, wherein D is a distance between a centerpoint C=C[I] and data in arr=arr={T}, and
   c) repeating step a for a next node;
applying the distance tree that has been constructed for each sub-set (M) to at least one of one of the plurality of computing nodes to compute a correlation on the sub-set (M) at the computing node;
for a leaf node (NL) at level (l) of the node in the tree graph:
   adding an array (arr) of the node at a level (NL) to a result set (t);
   determining a level (l) and partition number (pnum) of ancestor nodes (i);
   determining any adjacent partition number siblings (NA) with partition number pnum[i] or pnum[i]+1 for a corresponding node level (i), for each ancestor node of the node (NL) which is not a root node;
   identifying each child node at level (i) until leaf node or level=1 and for each child node that has been identified that is either a leaf node or at level (i) then add the array (arr) of the node or its descendent leaf to the result set (t);
   computing all pair correlation of each time-series in the result set(t); and
outputting all the correlations which are greater than $\varepsilon$.

6. The system of claim 5, further comprising:
d) for each node that is a leaf node, inserting the sub-set of the time-series dataset into an array.

7. The system of claim 6, wherein in response to a size of the array being below a settable threshold, further comprising:
e) getting a level (l) of a current leaf node;
f) replacing the current leaf node as a non-leaf node in the sub-set of the time-series dataset; and
g) splitting the array into a number of arrays according to partition number computed on a current level center point (C(l)).

8. The system of claim 5, further comprising:
traversing the distance tree and splitting the distance tree at every L/R leaf that is visited where R is the number computing nodes assigned by the MapReduce function;
for each subtree, find a left-most leaf node NL and get it level (l) and pnum[i] of its ancestors at level i in the tree graph;
for each ancestor of NL that is not a root node and find its children with partition number pnum=pnum[i] or pnum [i]+1 for corresponding level i; and
identifying each child node at level (i) until leaf node or level=1 and for each child node that has been identified that is either a leaf node or at level (i) then add the node if it is not a leaf node or add the node and its ancestor to the subtree.

9. A non-transitory computer program product for producing a time-series correlation on large volumes of data, the computer program product comprising a computer readable storage medium having computer readable program code embodied therewith, the computer readable program code configured to perform:
constructing an ordered center point list, wherein elements in the center point list are time-series dataset;
parsing the time-series dataset into sub-sets based on a partition number;
assigning the sub-sets of the time-series dataset to a plurality of computing nodes for distributed processing using a MapReduce function;
constructing a distance tree for each sub-set (M) in a set of sub-sets (M), which is independent of coordinates of data in the time-series dataset (T) and independent of dimensional reduction, by
selecting an initial center point C[0] for a given level (l) of a node in a tree graph;
constructing a root node;
assigning the sub-set of the time-series dataset one-by-one into vertices of the tree graph connected with the root node;
selecting a node of a distance tree with the center point C[0], where a correlation to the center point of a parent node to any non-root node satisfies $pnum*\varepsilon \leq C < (pnum+1)*\varepsilon$, wherein c is a settable threshold, a) for each node N that is not a leaf node, computing distance between the sub-set (M) to the initial center point (C[0]), and go to a child node of the node N,
b) creating a leaf node of node N with C=C[I], pnum=D, arr={T} based on an additional child node of the child node of node N being nonexistent, wherein D is a distance between a centerpoint C=C[I] and data in arr=arr={T}, and
c) repeating step a for a next node;

applying the distance tree that has been constructed for each sub-set (M) to at least one of one of the plurality of computing nodes to compute a correlation on the sub-set (M) at the computing node;

for a leaf node (NL) at level (l) of the node in the tree graph:
  adding an array (arr) of the node at a level (NL) to a result set (t);
  determining a level (l) and partition number (pnum) of ancestor nodes (i);
  determining any adjacent partition number siblings (NA) with partition number pnum[i] or pnum[i]+1 for a corresponding node level (i), for each ancestor node of the node (NL) which is not a root node;
  identifying each child node at level (i) until leaf node or level=1 and for each child node that has been identified that is either a leaf node or at level (i) then add the array (arr) of the node or its descendent leaf to the result set (t);
  computing all pair correlation of each time-series in the result set(t); and
outputting all the correlations which are greater than ε.

10. The non-transitory computer program product of claim 9, further comprising: d) for each node that is a leaf node, inserting the sub-set of the time-series dataset into an array.

11. The non-transitory computer program product of claim 10, wherein in response to a size of the array being below a settable threshold, further comprising:
  e) getting a level (l) of a current leaf node;
  f) replacing the current leaf node as a non-leaf node in the sub-set of the time-series dataset; and
  g) splitting the array into a number of arrays according to partition number computed on a current level center point (C(l)).

12. The non-transitory computer program product of claim 9, further comprising:
  traversing the distance tree and splitting the distance tree at every L/R leaf that is visited where R is the number computing nodes assigned by the MapReduce function;
  for each subtree, find a left-most leaf node NL and get it level (l) and pnum[i] of its ancestors at level i in the tree graph;
  for each ancestor of NL that is not a root node and find its children with partition number pnum=pnum[i] or pnum[i]+1 for corresponding level i; and
identifying each child node at level (i) until leaf node or level=1 and for each child node that has been identified that is either a leaf node or at level (i) then add the node if it is not a leaf node or add the node and its ancestor to the subtree.

* * * * *